U S010649993B2

United States Patent
Hama

(10) Patent No.: US 10,649,993 B2
(45) Date of Patent: May 12, 2020

(54) CONTINUOUS CASTER SCHEDULING WITH TEMPLATE DRIVEN SEARCH

(71) Applicant: INTERNATIONAL BUSINESS MACHINES CORPORATION, Armonk, NY (US)

(72) Inventor: Toshiyuki Hama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 610 days.

(21) Appl. No.: 15/350,270

(22) Filed: Nov. 14, 2016

(65) Prior Publication Data

US 2018/0137168 A1    May 17, 2018

(51) Int. Cl.
*G06F 16/2453* (2019.01)
*G06F 16/22* (2019.01)

(52) U.S. Cl.
CPC .... *G06F 16/24534* (2019.01); *G06F 16/2246* (2019.01); *G06F 16/2272* (2019.01)

(58) Field of Classification Search
CPC ........... G06F 16/24534; G06F 16/2272; G06F 16/2246
See application file for complete search history.

(56) References Cited

U.S. PATENT DOCUMENTS

| 8,312,037 | B1 * | 11/2012 | Bacthavachalu | ..... | G06F 9/5066 |
| | | | | | 707/769 |
| 2006/0253311 | A1 * | 11/2006 | Yin | ........................ | G06Q 10/06 |
| | | | | | 705/7.12 |
| 2007/0050069 | A1 * | 3/2007 | Treichler | ............... | G06Q 10/04 |
| | | | | | 700/99 |
| 2008/0172277 | A1 | 7/2008 | Davenport et al. | | |
| 2012/0323353 | A1 * | 12/2012 | Davenport | ............. | G06Q 10/06 |
| | | | | | 700/104 |

FOREIGN PATENT DOCUMENTS

| CN | 101339634 | 1/2009 |
| CN | 103984324 | 8/2014 |

(Continued)

OTHER PUBLICATIONS

Solving Resource-Constrained Project Scheduling Problems by A* Search. Article. [online]. Colin E. Bell and Kwangho Park, [ retrieved on Dec. 18, 2019]. Retrieved from internet: <URL: https://onlinelibrary.wiley.com/doi/epdf/10.1002/1520-6750%28199002%2937%3A1%3C61%3A%3AAID-NAV3220370104%3E3.0.CO%3B2-S> (Year: 1990).*

(Continued)

*Primary Examiner* — Darrin D Dunn
*Assistant Examiner* — Marzia T Monty
(74) *Attorney, Agent, or Firm* — Tutunjian & Bitetto, P.C.; Vazken Alexanian

(57) ABSTRACT

Methods and systems for scheduling include forming a search tree. Each node in the search tree represents a scheduling unit formed from a priority queue that includes orders from multiple, mutually compatible sets of orders and wherein each path through the search tree represents a sequence of orders and has an associated priority score. The search tree is searched for a path having an optimal associated priority score. A schedule is implemented based on the path having the optimal associated priority score.

20 Claims, 6 Drawing Sheets

(56) References Cited

FOREIGN PATENT DOCUMENTS

| | | |
|---|---|---|
| CN | 105550751 | 5/2016 |
| CN | 105550771 | 5/2016 |
| EP | 2894426 | 7/2015 |

OTHER PUBLICATIONS

Arezoo Atichehchian et al., A novel hybrid algorithm for scheduling steel-making continuous casting production, Computers & Operations Research, Computers & Operations Research 36, Aug. 2009, 2450-2461.

Kiu-Ying Wang et al., Intelligent Optimization Scheduling of Steel-making and Continuous Casting Production and Its Application, Proceedings of the 8th World Congress on Intelligent Control and Automation, Jul. 6-9, 2010.

* cited by examiner

CONTINUOUS CASTER SCHEDULING WITH TEMPLATE DRIVEN SEARCH

BACKGROUND

Technical Field

The present invention generally relates to caster scheduling in metallurgy and, more particularly, to long-term continuous scheduling based on a template-driven search.

Description of the Related Art

When scheduling caster processing for, e.g., steel processing, a substantial amount of computational resources are expended to optimize the schedule that determines a production sequence of slabs. In general, only weekly schedules are used so far. However, steel manufacturers make monthly capacity plans based on the daily production capacity of the continuous caster and uses the monthly plan for answering order due dates.

In general, a scheduling unit in steel processing is referred to herein as a "cast," which is formed from a sequence of smaller scheduling units that are referred to herein as "charges," where each charge is made up of a sequence of individual slabs. In conventional systems, individual charges are formed as an optimized grouping of compatible slabs. A daily schedule is then formed by determining a sequence of the charges.

However, such a bottom-up scheduling system, which determines smaller scheduling unit first, fails to reach an optimal solution in terms of grouping of slabs in a charge if there exist slabs that may be shared by different groups. In practical scenarios, such slabs are common. The same is also true for other scheduling methods which, for example, fix the grouping of slabs in a charge in advance.

SUMMARY

A method for scheduling includes forming a search tree. Each node in the search tree represents a scheduling unit formed from a priority queue that includes orders from multiple, mutually compatible sets of orders and wherein each path through the search tree represents a sequence of orders and has an associated priority score. The search tree is searched for a path having an optimal associated priority score. A schedule is implemented based on the path having the optimal associated priority score.

A method for scheduling includes initializing a plurality of priority queues, each priority queue having one or more associated, mutually compatible sets of orders. A search tree is formed using a processor. Each node in the search tree represents a scheduling unit formed from one of the plurality of priority queues and wherein each path through the search tree represents a sequence of orders and has an associated priority score. The search tree is searched for a path having an optimal associated priority score using a breadth-first search. Searching the search tree is performed during formation of the search tree, with each level of the search tree being searched before a new level is formed. A schedule is implemented based on the path having the optimal associated priority score.

A system for scheduling includes a search module comprising a processor configured to form a search tree and to search the search tree for a path having an optimal associated priority score. Each node in the search tree represents a scheduling unit formed from a priority queue that includes orders from multiple, mutually compatible sets of orders and wherein each path through the search tree represents a sequence of orders and has an associated priority score. A control module is configured to implement a schedule based on the path having the optimal associated priority score.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide continuous caster scheduling that uses a template-based search to provide an optimal order of scheduling units. As will be explained in greater detail below, a "template" is used to refer to a set of parameters that define compatible orders. Compatible units may be grouped together in a single template, even if those units differ in other respects. A tree of every possible order of scheduling While the present embodiments are described with particular emphasis on their application to steel-making, it should be understood that they may be applied to any appropriate scheduling problem. In the present embodiments, it should be understood that each template may be defined by the physical size of steel slabs produced and a set of compatible steel grades and/or compositions. Thus, a given order may be compatible with one or more different templates. Each order additionally has an associated priority that may be defined by, e.g., a deadline for fulfillment of the order.

Figure 1:
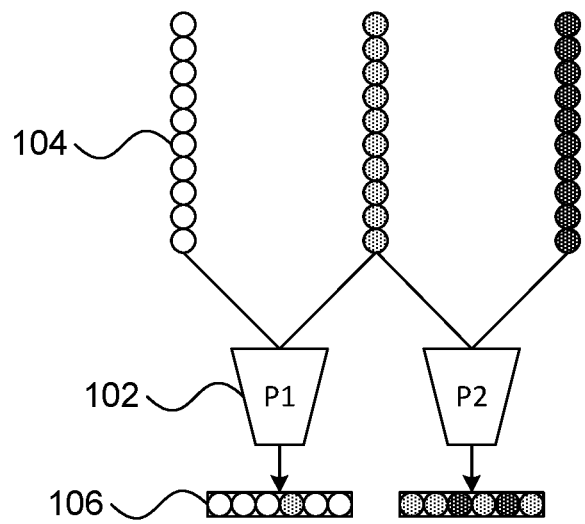
FIG. 1 is a diagram showing the formation of priority queues from mutually compatible sets in accordance with the present embodiments.

Referring now to FIG. 1, a diagram showing a relationship between templates and orders is shown. Toward that end, the present invention builds template priority queues 102 based on each template. Each priority queue 102 is fed by one or more sets of compatible orders 104. Each set of orders 104 represents an order of a particular type, having specific fabrication parameters that may be more specific than those defined by the template. As a result, multiple different sets of orders 104 may match a particular template and may, therefore be associated with a single template priority queue 102. It should be understood that there may be many more priority queues 102 and that any number of sets of orders 104 may be associated with each priority queue 102.

Each priority queue 102 will generate respective scheduling units 106. A scheduling unit 106 is formed from a fixed number of individual orders. In the specific context of steelmaking, the scheduling unit 106 may represent a single charge of material. The number of orders that can be fulfilled in a given scheduling unit 106 is set in advance and may represent, for example, a volume of steel in a single charge.

Notably, the set of orders 104 in the middle is compatible with template P1 and template P2. As such, either priority queue 102 in this example can draw from that set of orders, resulting in scheduling units 106 made up of orders from multiple different sets of orders 104. Each priority queue 102 therefore draws the highest priority order from its associated sets of orders 104 until a full scheduling unit 106 has been formed.

Figure 2:
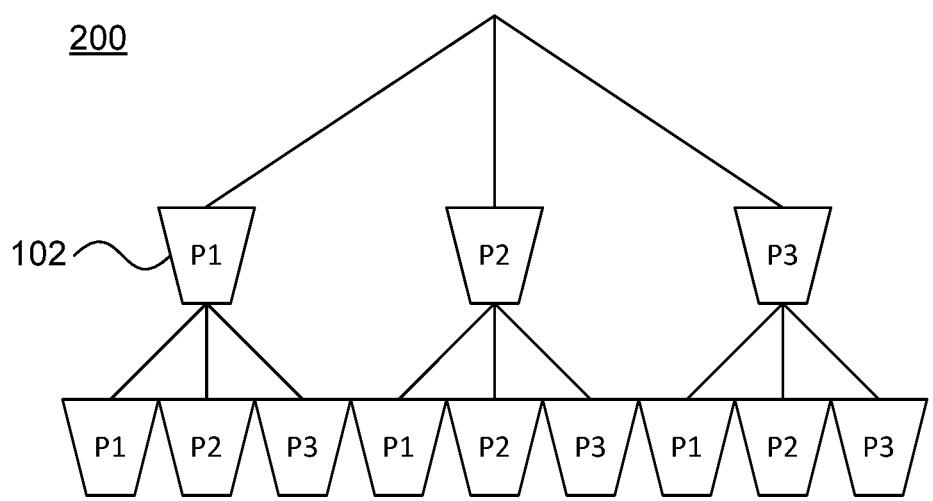
FIG. 2 is a block diagram showing a search tree for scheduling orders from multiple priority queues in accordance with the present embodiments.

Referring now to FIG. 2, an exemplary scheduling tree 200 is shown. Each node of the scheduling tree 200 represents a scheduling unit 106 generated by one of the priority queues 102. In this example, with three different priority queues 102 (P1, P2, and P3), the first scheduling unit 106 is selected by each priority queue 102 according to the highest-priority orders in its associated order sets 104 at that point in time. At the second level of the tree, each priority queue 102 selects new scheduling units 106 according to the updated order sets 104 for each of the possible scheduling units 102 from the first level, noting that orders may have been removed from multiple sets 104 in forming the first scheduling unit 106.

In this manner, every possible sequence of scheduling units 106 is expressed by the different paths through the tree 200. Each path is characterized by a priority score that, for example, represents the sum of priority values from every order in every scheduling unit in the path. An exemplary path through the tree 200 might pass first through a scheduling unit 106 generated by P3, followed by a scheduling unit 106 generated by P1. The present embodiments perform a search through the tree 200 to find the path through the tree 200 that has the highest score. This path represents the optimal schedule.

It is specifically contemplated that a breadth-first search may be performed to locate the best path through the tree 200, but it should be understood that any appropriate tree search may be used instead. The length of the path may be any appropriate length and may be set by the user or may alternatively be dictated by the needs of an associated manufacturing process. In one specific example, the length of the path may correspond to a single workday. In an alternative example, the path may be extended until all of the orders in all of the sets of orders 104 have been scheduled.

Figure 3:
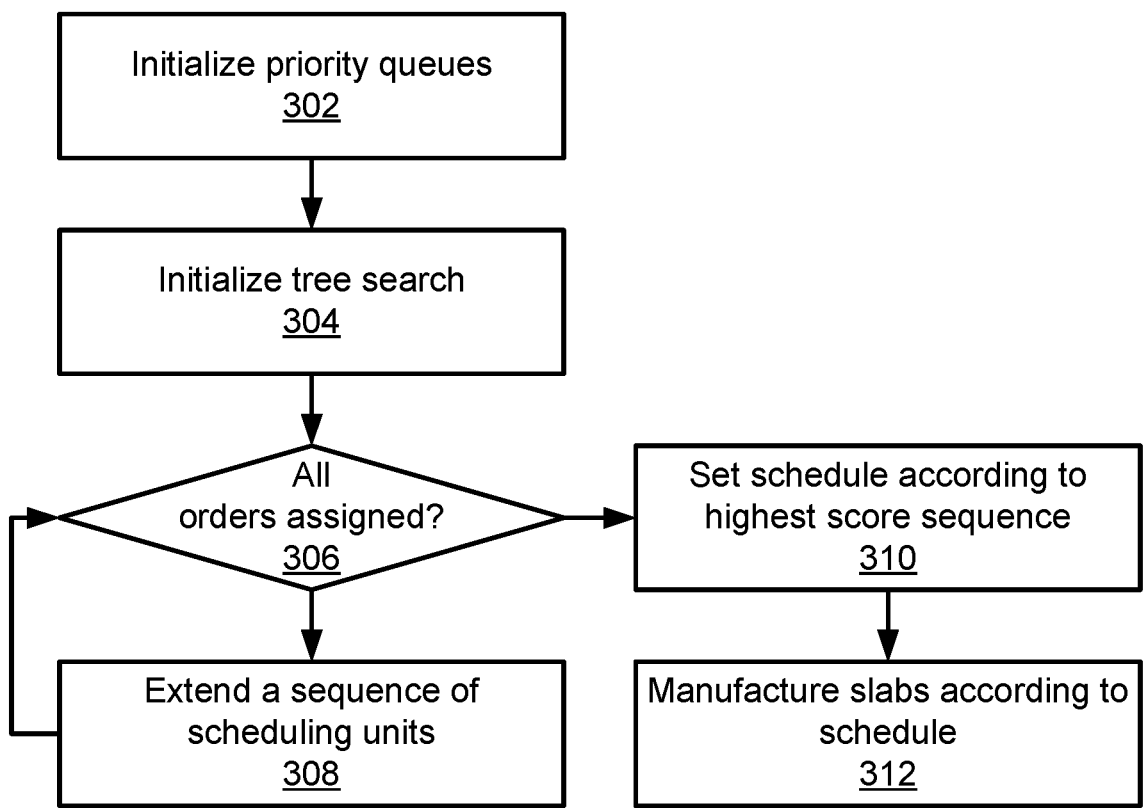
FIG. 3 is a block/flow diagram showing a method/system for scheduling in accordance with the present embodiments.

Referring now to FIG. 3, a method of scheduling is shown. Block 302 initializes the priority queues. As described above, this may be accomplished by forming sets 104 of individual order types, ordered by priority, and associating order sets 104 according to template compatibility. The resulting priority queues 102 draw the highest-priority order from all of its associated order sets 104.

Block 304 initializes a tree search across a scheduling tree by selecting a specific scheduling unit 106 from any of the priority queues, determining its priority score, and saving that sequence and score. This initial value represents the first state in the search of the scheduling tree. Block 306 then determines whether all of the orders in all of the order sets 104 have been assigned. In alternative embodiments, block 306 may determine whether a different criterion for the sequence path length has been met.

If not, block 308 extends the sequence of scheduling units 106 by adding another lay of scheduling units 106 to the search tree, generating a new scheduling unit 106 from each priority queue 102 at each node of the tree. Block 308 determines the priority scores of each path through the new, larger tree, updating the highest-score path. Once all of the orders have been assigned in block 306, block 310 takes the path through the scheduling tree that has the highest score and sets the schedule according to the associated sequence of scheduling units 106. Once a schedule set, block 312 proceeds with manufacturing of slabs (in the case of a steelworking example) in accordance with the schedule.

Figure 4:
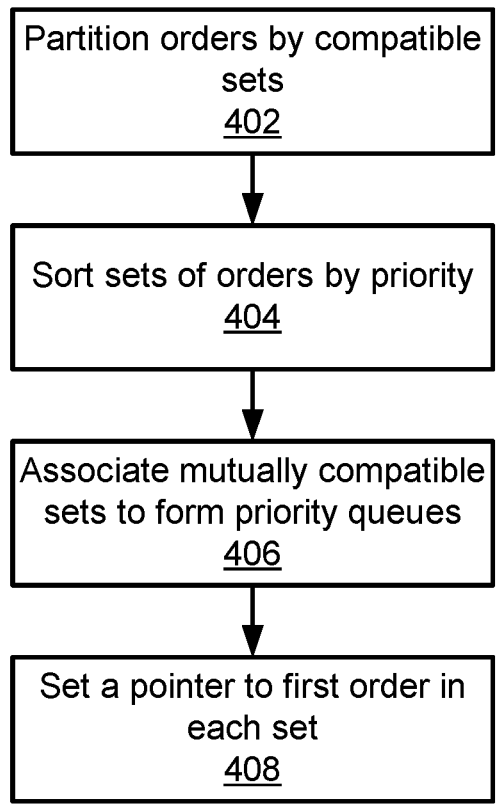
FIG. 4 is a block/flow diagram showing a method/system for initializing priority queues in accordance with the present embodiments.

Referring now to FIG. 4, additional detail is shown on the initialization of the priority queues 102 in block 302. Block 402 partitions orders by compatible sets, forming the order sets 104. Block 404 sorts each order set 104 by priority. Block 406 associates mutually compatible order sets 104 to form the priority queues 102. Block 408 then sets a pointer to the first order in each of the order sets 104. As orders are taken from the order sets 104 to fill scheduling units 106, the pointer is moved down to the next-highest priority order in the set.

Figure 5:
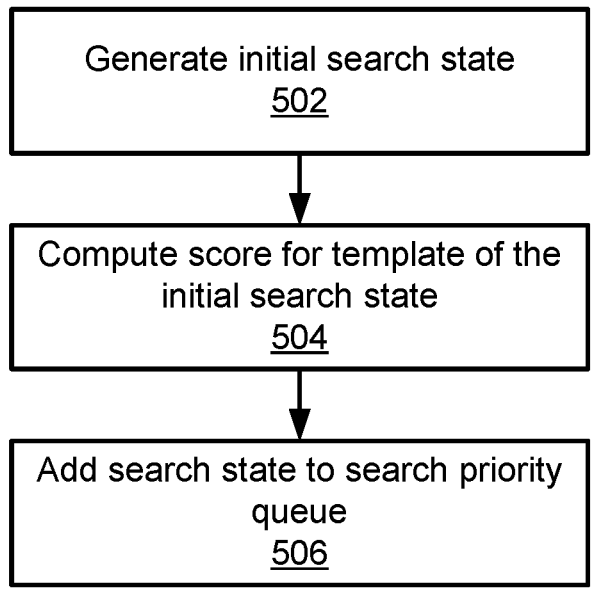
FIG. 5 is a block/flow diagram showing a method/system for initializing a search tree in accordance with the present embodiments.

Referring now to FIG. 5, additional detail is shown on the initialization of the search tree in block 304. Block 502 generates an initial search state. The search states described herein refer to respective paths through the searching tree. The initial search state represents a single scheduling unit 106 generated by each of the priority queues 102. Block 504 computes a score for the initial search state. In one specific embodment, the priority score is a sum of all of the priority scores of all of the priorities in all of the scheduling units in a search state, with higher scores representing higher priorities, but it should be understood that different ways of expressing priority may be used with correspondingly different ways to combine the priority scores.

Block 506 then adds the search state to a search priority queue. The search priority queue stores the sequence of the scheduling units 106 and their constituent orders in each path along with a respective priority score. Block 506 stores only the first search state of each priority queue 102 to initialize the process.

Figure 6:
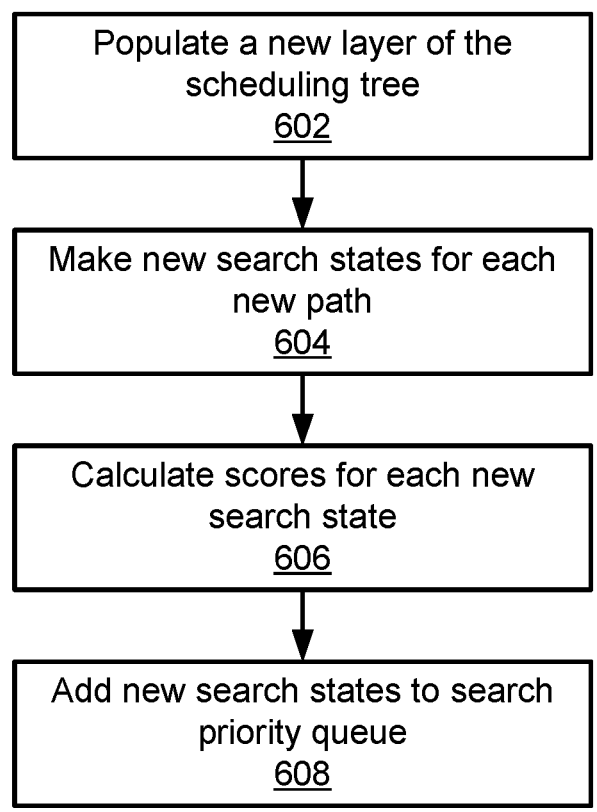
FIG. 6 is a block/flow diagram showing a method/system for performing a width-first search of a search tree in accordance with the present embodiments.

Referring now to FIG. 6, additional detail is shown on the extension of the sequence of scheduling units 106 in block 308. Block 602 populates a layer of the scheduling tree. Populating the layer of the scheduling tree includes creating a scheduling unit 106 for each priority queue 102 at each leaf of the scheduling tree, with each new scheduling unit 106 representing a new node of the scheduling tree. Block 604 makes new search states for each new path corresponding to the new nodes of the scheduling tree. Block 606 calculates the priority scores for each new search state as described above, summing the priority score of each order in each scheduling unit in the path represented by the search state. Block 608 adds the search state to the search priority queue with the respective score acting as an index to the queue. Thus, the top element of the search priority queue will be the path through the scheduling tree having the highest total priority score.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
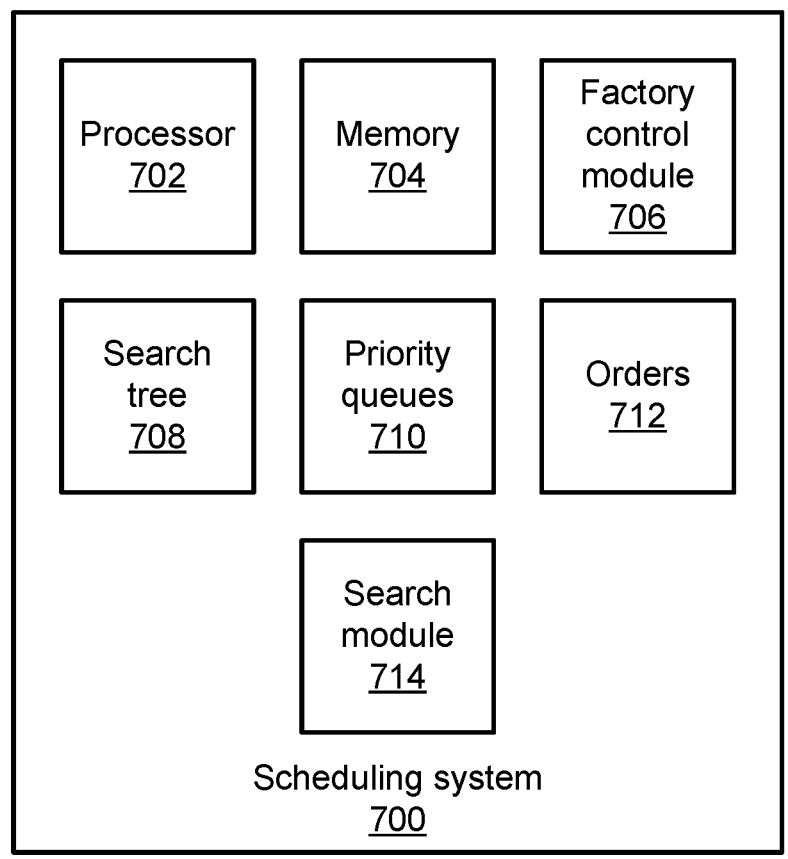
FIG. 7 is a block diagram of a scheduling system in accordance with the present embodiments.

Referring now to FIG. 7, a scheduling system 700 is shown. The scheduling system 700 includes a hardware processor 702 and memory 704. In addition, the scheduling system includes one or more functional modules that may be implemented as software that is stored in memory 704 and executed by hardware processor 702. In alternative embodiments, the functional modules may be implemented as one or more discrete hardware components in the form of, e.g., application specific integrated chips or field programmable gate arrays.

In particular, a search module 714 builds a search tree 708 of all of the possible sequences of scheduling units 106 that are drawn from priority queues 710. The priority queues 710 in turn draw from sets of orders 712 that are mutually compatible. The search module 714 performs a breadth-first search over the search tree 708 to determine an optimal schedule that uses all of the orders 712. Based on this schedule, factory control module 706 implements the schedule to control the output of, e.g., steel manufacturing, setting a sequence of individual orders 712 in individual charges and casts.

Figure 8:
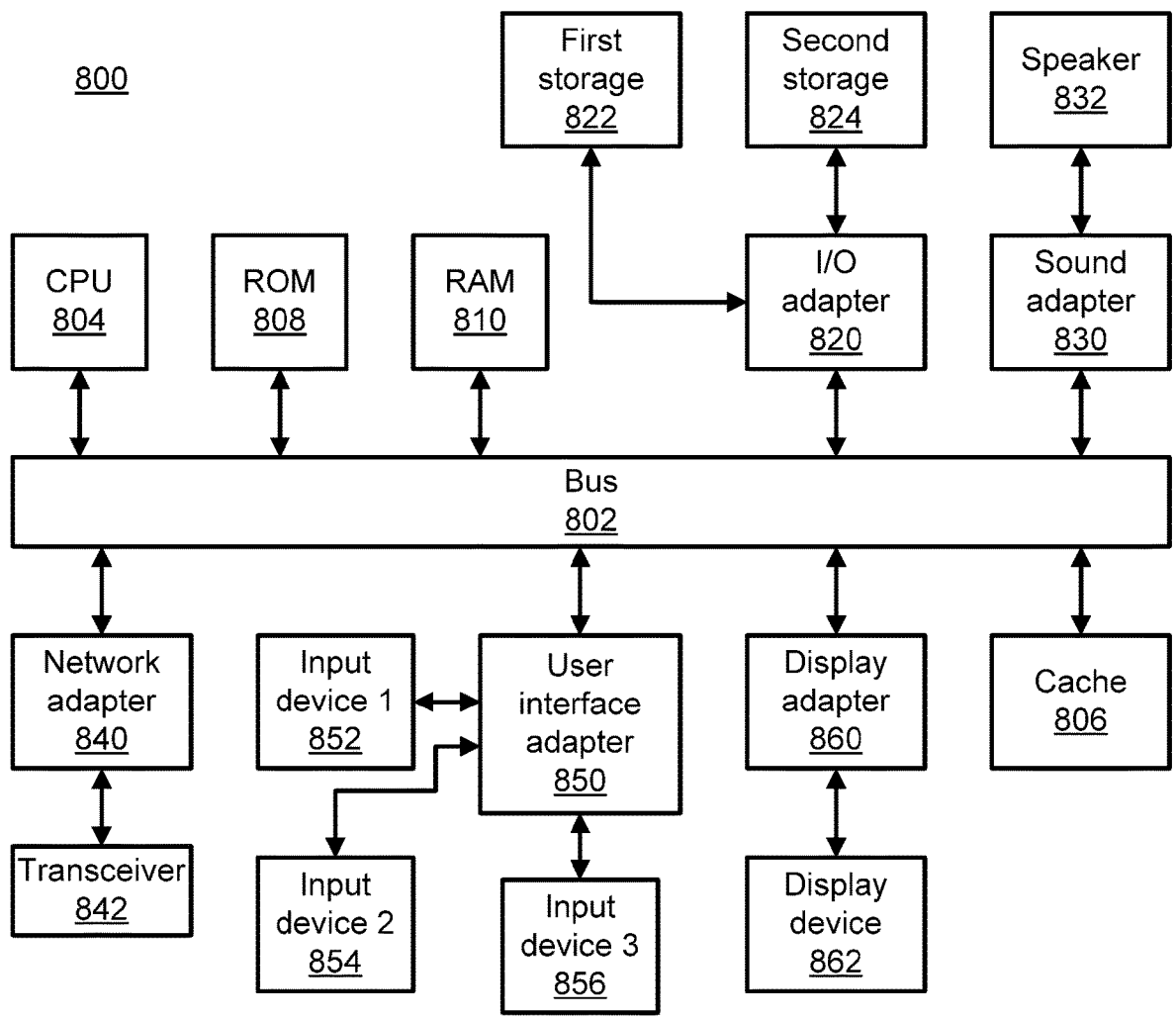
FIG. 8 is a block diagram of a processing system in accordance with the present embodiments.

Referring now to FIG. 8, an exemplary processing system 800 is shown which may represent the transmitting device 100 or the receiving device 120. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for scheduling, comprising:
   forming a search tree using a processor, wherein each node in the search tree represents a scheduling unit formed from a priority queue that includes orders from multiple, mutually compatible sets of orders and wherein each path through the search tree represents a sequence of orders and has an associated priority score;
   searching the search tree for a path having an optimal associated priority score; and
   implementing a schedule based on the path having the optimal associated priority score.

2. The computer-implemented method for scheduling of claim 1, further comprising initializing a plurality of priority queues, each priority queue having one or more associated, mutually compatible sets of orders.

3. The computer-implemented method for scheduling of claim 1, wherein each priority queue represents a steel-making template.

4. The computer-implemented method for scheduling of claim 3, wherein each steel-making template defines compatible sets of orders based on output slab size and steel grade.

5. The method of claim 3, wherein each scheduling unit includes a single charge of steelmaking material.

6. The computer-implemented method for scheduling of claim 1, wherein searching the search tree comprises performing a breadth-first search.

7. The computer-implemented method for scheduling of claim 6, wherein searching the search tree is performed during formation of the search tree, with each level of the search tree being searched before a new level is formed.

8. The method of claim 7, wherein searching the search tree includes populating a layer of the search tree by creating a node for each priority queue at each leaf of the search tree and calculating scores for each new path through the search tree.

9. The computer-implemented method for scheduling of claim 1, wherein forming the search tree comprises generating a scheduling unit based on each of the plurality of priority queues for each leaf node of the search tree.

10. The computer-implemented method for scheduling of claim 1, wherein implementing the schedule comprises performing one or more manufacturing tasks.

11. The method of claim 1, wherein each scheduling unit includes a fixed number of individual orders.

12. The method of claim 1, further comprising initializing the priority queues by partitioning orders according to compatibility and sorting each queue according to a priority that is based on a deadline.

13. A non-transitory computer readable storage medium comprising a computer readable program for scheduling, wherein the computer readable program when executed on a computer causes the computer to perform the steps of:
forming a search tree using a processor, wherein each node in the search tree represents a scheduling unit formed from a priority queue that includes orders from multiple, mutually compatible sets of orders and wherein each path through the search tree represents a sequence of orders and has an associated priority score;
searching the search tree for a path having an optimal associated priority score; and
implementing a schedule based on the path having the optimal associated priority score.

14. A system for scheduling, comprising:
a search module comprising a processor configured to form a search tree and to search the search tree for a path having an optimal associated priority score, wherein each node in the search tree represents a scheduling unit formed from a priority queue that includes orders from multiple, mutually compatible sets of orders and wherein each path through the search tree represents a sequence of orders and has an associated priority score; and
a control module configured to implement a schedule based on the path having the optimal associated priority score.

15. The system of claim 14, wherein the search module is further configured to initialize a plurality of priority queues, each priority queue having one or more associated, mutually compatible sets of orders.

16. The system of claim 14, wherein each priority queue represents a steel-making template.

17. The system of claim 16, wherein each steel-making template defines compatible sets of orders based on output slab size and steel grade.

18. The system of claim 14, wherein the search module is further configured to perform a breadth-first search of the search tree.

19. The system of claim 18, wherein the search module is further configured to search the search tree during formation of the search tree, with each level of the search tree being searched before a new level is formed.

20. The system of claim 14, wherein the search module is further configured to generate a scheduling unit based on each of the plurality of priority queues for each leaf node of the search tree.

* * * * *